(12) United States Patent
Ito et al.

(10) Patent No.: US 6,913,362 B2
(45) Date of Patent: *Jul. 5, 2005

(54) PROJECTION DISPLAY APPARATUS AND METHOD OF DISPLAY

(75) Inventors: Takafumi Ito, Suwa (JP); Shoichi Akaiwa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/743,863

(22) Filed: Dec. 24, 2003

(65) Prior Publication Data

US 2004/0135977 A1 Jul. 15, 2004

Related U.S. Application Data

(63) Continuation of application No. 09/714,189, filed on Nov. 17, 2000, now Pat. No. 6,712,476, which is a continuation of application No. PCT/JP00/01619, filed on Mar. 16, 2000.

(30) Foreign Application Priority Data

Mar. 17, 1999 (JP) .............................................. 11-71737

(51) Int. Cl.$^7$ ........................ G03B 31/00; G03B 23/02; G03B 21/00; G09G 5/39; H04N 9/31
(52) U.S. Cl. ........................... 353/122; 353/15; 353/25; 345/532; 345/522; 348/744; 711/103
(58) Field of Search ........................... 353/15, 25, 122; 345/532–533, 522; 348/744; 711/103, 105

(56) References Cited

U.S. PATENT DOCUMENTS

| | | | |
|---|---|---|---|
| 4,994,987 A | 2/1991 | Baldwin | 434/305 |
| 5,231,434 A | 7/1993 | Kennedy et al. | 353/122 |
| 5,523,958 A | 6/1996 | Takeuchi | 348/571 |
| 5,630,659 A | 5/1997 | Ronzani et al. | 353/15 |
| 5,737,416 A | 4/1998 | Cooper et al. | 705/52 |
| 5,782,548 A * | 7/1998 | Miyashita | 353/42 |
| 5,859,623 A | 1/1999 | Meyn et al. | 345/730 |
| 6,104,396 A | 8/2000 | Hanaoka et al. | 345/839 |
| 6,128,629 A | 10/2000 | Bretschneider et al. | 707/203 |
| 6,239,810 B1 | 5/2001 | Van Hook et al. | 345/420 |
| 2002/0122075 A1 * | 9/2002 | Karasawa et al. | 345/846 |

FOREIGN PATENT DOCUMENTS

| | | |
|---|---|---|
| JP | 5-120398 | 5/1993 |
| JP | 6-231318 | 8/1994 |
| JP | 7-078376 | 3/1995 |
| JP | 7-121674 | 5/1995 |
| JP | 7-306756 | 11/1995 |
| JP | 9-325413 | 12/1997 |
| JP | 10-107747 | 4/1998 |
| JP | 10-134030 | 5/1998 |
| JP | 11-68988 | 3/1999 |

\* cited by examiner

Primary Examiner—Rodney Fuller
Assistant Examiner—Magda Cruz
(74) Attorney, Agent, or Firm—Oblon, Spivak, McClelland, Maier & Neustadt, P.C.

(57) ABSTRACT

A projection display apparatus which display a projected image and may be free from connection with a computer. The projection display apparatus carries out processing with information stored in a portable memory and includes a memory controller that reads out the information stored in the portable memory; an image processing section that prepares display image data. The display image data represents an image to be displayed from the image data stored in the portable memory according to an instruction of a processing program that is read from the portable memory and represents a series of processing steps to be executed by the projection display apparatus. An electro-optic device then forms image light in response to the display image data, and an optical system projects the image light to display the image.

14 Claims, 10 Drawing Sheets

```
Begin                        (L1)
    Power ON                 (L2)
    Set Source "CARD"        (L3)
    Display "Picture1"       (L4)
    Wait 10000msec           (L5)
    Play "Wave2"             (L6)
    Display "Picture3"       (L7)
    Pause                    (L8)
    Set Source "VIDEO"       (L9)
    Pause                    (L10)
    Set Source "CARD"        (L11)
    Display "Picture2"       (L12)
    Wait 10000msec           (L13)
    Power OFF                (L14)
END                          (L15)
```

```
Begin                               (L1)
    Power ON                        (L2)
    Set Source "CARD"               (L3)
    Display "Picture1"              (L4)
    Wait "10000msec"                (L5)
    Play "Wave2"                    (L6)
    Display "Picture3"              (L7)
    Pause                           (L8)
    Superimpose Source "MEM"        (L9)
        Coordinate "400,160,600,200" (L10)
        Display "Dec1"              (L11)
    Pause                           (L12)
    Set Source "CARD"               (L13)
    Display "Picture2"              (L14)
    Wait "10000msec"                (L15)
    Power OFF                       (L16)
END                                 (L17)
```

PROJECTION DISPLAY APPARATUS AND METHOD OF DISPLAY

CROSS-REFERENCE TO RELATED APPLICATIONS

This application is Continuation and claims priority to U.S. patent application Ser. No. 09/714,189, filed Nov. 17, 2000, now U.S. Pat. No. 6,712,476, which is a continuation of PCT/JP00/01619, filed Mar. 16, 2000, which claims priority to Japanese Patent Application No. JP11-71737, filed Mar. 17, 1999. The entire contents of the U.S. patent application is incorporated herein by reference.

FIELD OF THE INVENTION

The present invention relates to a technique of a projection display apparatus that displays a projected image.

DISCUSSION OF THE BACKGROUND

The projection display apparatus enables an image supplied from a personal computer to be displayed as an enlarged image on a projection screen and is therefore often used for presentations. In the course of a presentation, a plurality of presentation sheets (hereinafter may be referred to as "slides") are sequentially changed for display on the projection screen.

With a prior art projection display apparatus a user changes over the presentation sheets. More specifically, the presentation sheets are changed over according to the user's instruction input through the key operation into the computer. Connection of the computer is thus essential for the prior art projection display apparatus.

SUMMARY OF THE INVENTION

The object of the present invention is thus to solve the disadvantage of the prior art discussed above and to provide a technique that enables a projection display apparatus, which may be free from connection with a computer, to display a projected image.

At least part of the above and the other related objects is attained by a projection display apparatus that carries out processing with information stored in a portable memory. The projection display apparatus includes: a memory controller that reads out the information stored in the portable memory; an image processing section that prepares display image data, which represents an image to be displayed, using at least one out of a plurality of image data stored in the portable memory according to an instruction of a processing program that is read from the portable memory and represents a series of processing to be executed by the projection display apparatus; an electro-optic device that forms image light in response to the display image data; and an optical system that projects the image light to display the image. This projection display apparatus displays an image using the image data stored in the memory according to the instruction of the processing program stored in the memory. This arrangement enables the projection display apparatus, which may not be connected with a computer, to automatically execute the series of processing and thereby to project and display the image.

In the projection display apparatus described above, it is preferable that the image processing section carries out control of the projection display apparatus according to an instruction of the processing program. This arrangement enables the image processing section to carry out a diversity of control operations of the projection display apparatus according to the processing program. For example, the image processing section controls a sleep state and a standby state of a hardware circuit.

In the projection display apparatus of the above arrangement, the control of the projection display apparatus may include control of an electric power supply circuit. This application controls the electric power supply circuit to control a sleep state and a standby state of the projection display apparatus.

In accordance with one preferable embodiment of the present invention, the projection display apparatus reproduces sound based on the information stored in the portable memory. This arrangement enables dialogues of people and sound effects to be reproduced, based on sound data stored in the portable memory.

In accordance with another preferable application of the projection display apparatus, the image processing section selects either one of image data supplied externally and image data read from the portable memory according to an instruction of selection included in the processing program, and prepares the display image data using the selected image data. This arrangement enables the image processing section to use not only the image data stored in the memory but image data supplied externally, for example, from an external image supply apparatus. The image processing section selects the desired image data to be displayed according to the instruction of the processing program.

In accordance with another preferable embodiment of the present invention, the projection display apparatus further has an embellishment image memory that stores at least one embellishment image data. The image processing section combines either one of the image data read from the portable memory and the image data supplied externally with the embellishment image data according to an instruction of composition included in the processing program, so as to prepare the display image data. This arrangement enables embellishment effects to be given to an image expressed by the image data read from the portable memory or the externally supplied image data.

In accordance with yet another preferable application of the projection display apparatus, the image processing section has a processing program editor that edits the processing program, and the memory controller has a function of writing the processing program edited by the processing program editor into the portable memory. These arrangement enables the processing program stored in the memory to be edited in the projection display apparatus. This is convenient when some modification of the processing program is required.

The present invention is also directed to a method of displaying an image with a projection display apparatus that includes an electro-optic device and carries out-processing with information stored in a portable memory. The method includes the steps of: reading out the information stored in the portable memory; preparing display image data, which represents an image to be displayed, using at least one out of a plurality of image data stored in the portable memory according to an instruction of a processing program that is read from the portable memory and represents a series of processing to be executed by the projection display apparatus; causing the electro-optic device to form image light in response to the display image data; and projecting the image light to display the image.

This method has the same functions and advantages as those of the projection display apparatus discussed above. Namely this method enables the projection display apparatus, which may not be connected with a computer, to automatically execute the series of processing and thereby to project and display the image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

A. First Embodiment

Figure 1:
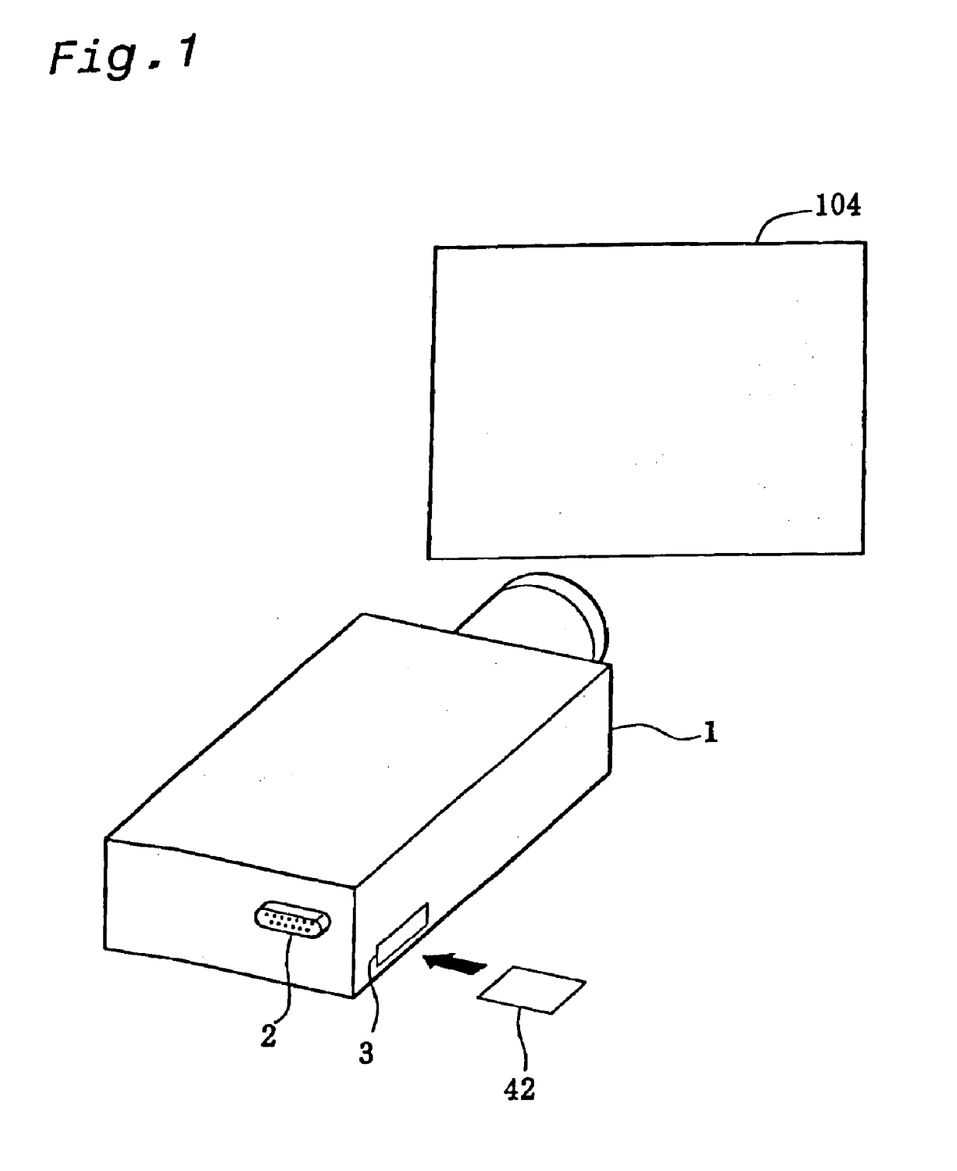
FIG. 1 illustrates a projection display apparatus in a first embodiment of the present invention.

Referring now to the drawings wherein like reference numerals designate identical or corresponding parts throughout the drawings, a projection displays apparatus and method of display is shown. An embodiment of this invention is shown in FIG. 1 which illustrates a high level diagram of a projection display system. In FIG. 1, a projection display apparatus 1 includes a connection terminal 2 that is connectable with an image supply apparatus, such as a personal computer or a video recorder, and a memory slot 3 that receives a memory card 42 inserted therein. The memory card 42 includes a processing program that records a series of processing steps to be executed by the projection display apparatus 1. On insertion of the memory card 42, the projection/display apparatus 1 reads the processing program recorded in the memory card 42 and executes the series of processing steps according to the processing program to project and display an image on a screen 104. It is to be understood that a variety of rewritable and portable recording media, such as flexible disks and magneto-optic discs etc., may be used to record the processing program, in place of the memory card 42 shown in FIG. 1.

Figure 2:
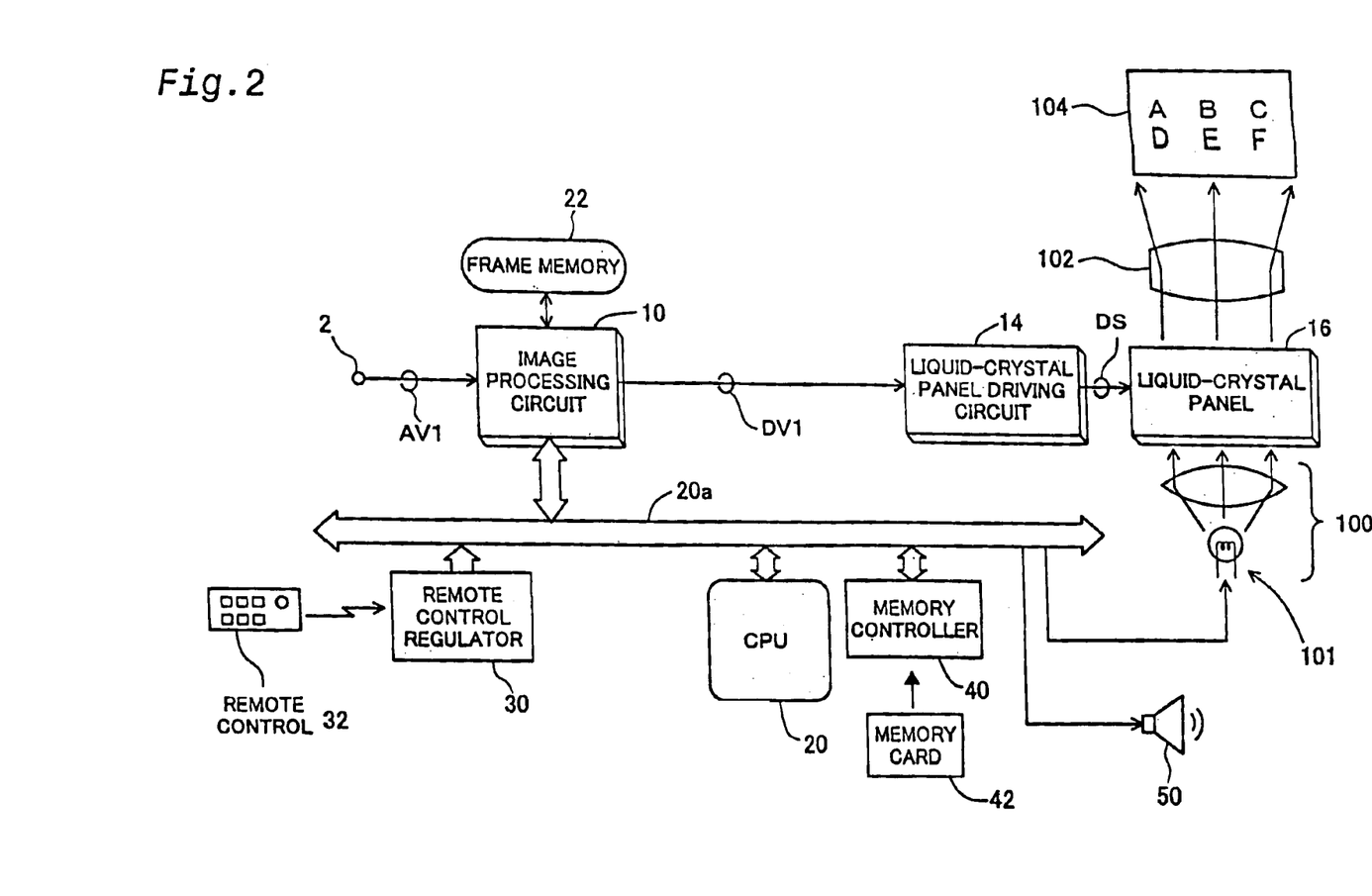
FIG. 2 is a block diagram showing the general structure of the projection display apparatus of the first embodiment.

FIG. 2 is a block diagram showing the general structure of the projection display apparatus 1 of the first embodiment. The projection display apparatus of this embodiment includes an image processing circuit 10, a liquid-crystal panel driving circuit 14, a liquid-crystal panel 16, a CPU 20, a frame memory 22, a remote control regulator 30, a memory controller 40, a speaker 50, an illumination optical system 100 including a lamp 101, and a projection optical system 102. The image processing circuit 10, the CPU 20, the remote control regulator 30, and the memory controller 40 are mutually connected via a bus 20a. The liquid-crystal panel driving circuit 14 is also connected to the bus 20a, although the connection is not shown in the illustration of FIG. 2. The liquid-crystal panel 16 is substantially uniformly illuminated by the illumination optical system 100. Image light formed by the liquid-crystal panel 16 is projected onto the screen 104 by the projection optical system 102. The optical systems 100 and 102 are simplified in the illustration of FIG. 2.

The image processing circuit 10, the liquid-crystal panel driving circuit 14, the CPU 20, the frame memory 22, and the remote control regulator 30 of the embodiment of FIG. 2 correspond to the image processing section of the present invention. The liquid-crystal panel 16 corresponds to the electro-optic device of the present invention.

Figure 3:
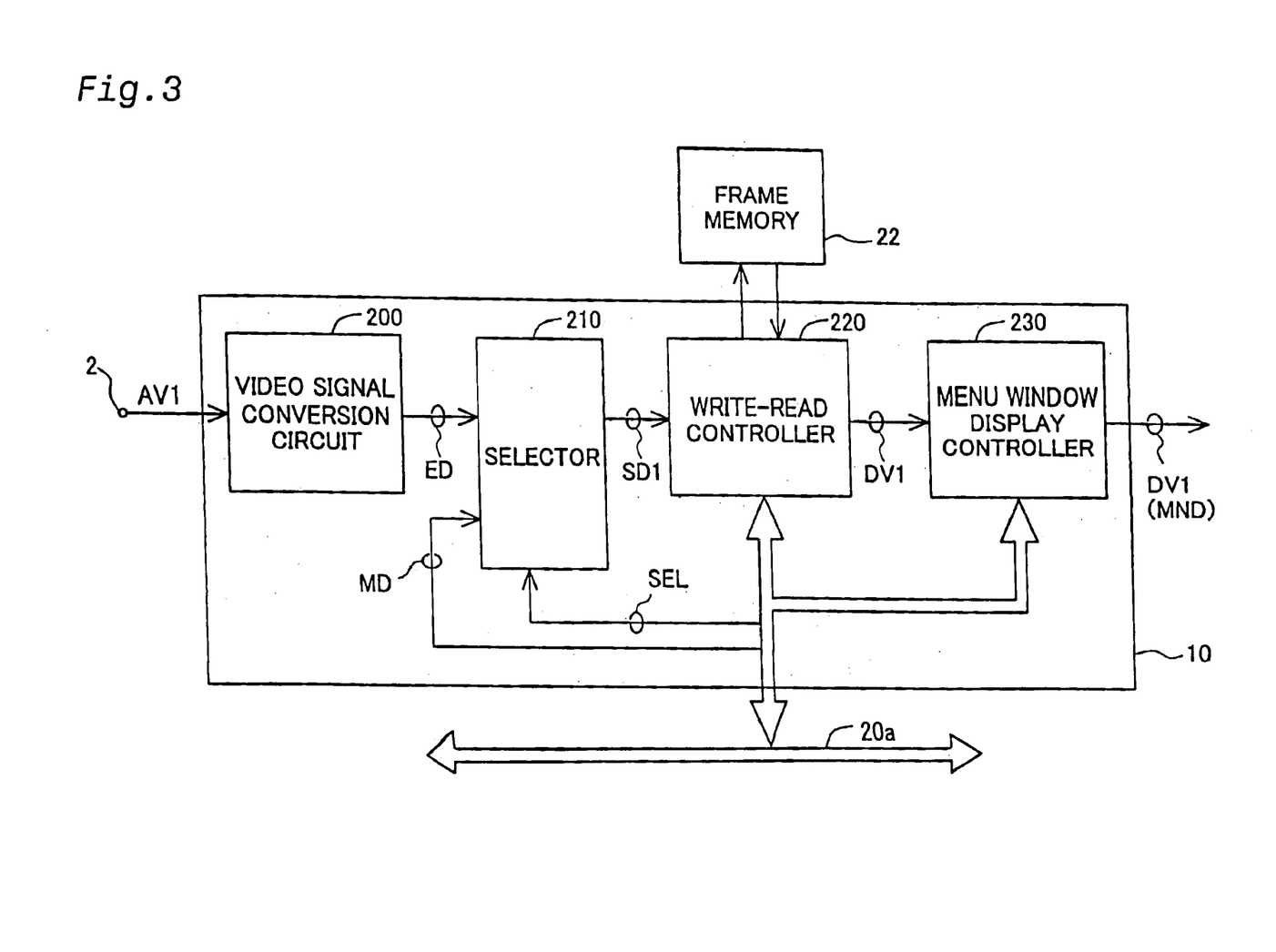
FIG. 3 schematically illustrates the internal structure of the image processing circuit 10.

The image processing circuit 10 has a function of preparing image data to be displayed on the screen 104 in response to an instruction from the CPU 20. FIG. 3 schematically illustrates the internal structure of the image processing circuit 10 which includes a video signal conversion circuit 200, a selector 210, a write-read controller 220, and a menu window display controller 230.

In the case where an image supply apparatus is connected to the connection terminal 2 shown in FIG. 1, an analog video signal AV1 is supplied to the video signal conversion circuit 200 via the connection terminal 2. The video signal conversion circuit 200 carries out analog-to-digital conversion of the given analog video signal AV1 and outputs AD-converted image data ED (hereinafter referred to as the "external image data"). The analog video signal AV1 may be, for example, an RGB signal output from a personal computer, the RGB signal representing a computer monitor screen, or a composite video signal output from a video recorder or a television, the composite video signal representing a motion image.

The external image data ED output from the video signal conversion circuit 200, and image data MD (hereinafter referred to as the "memory image data") supplied from the memory card 42 (FIG. 2) via the bus 20a are supplied to the selector 210. The memory image data MD recorded in the memory card 42 is read by the memory controller 40 in response to an instruction from the CPU 20. The selector 210 selects either one of the external image data ED and the memory image data MD in response to a selection signal SEL supplied from the CPU 20 via the bus 20a, and outputs the selected image data as digital image data SD1. In the case where an image supply apparatus is not connected to the connection terminal 2 and the memory card 42 is attached to the memory controller 40, the memory image data MD is selected automatically.

The write-read controller 220 has a function of writing the digital image data SD1 output from the selector 210 into the frame memory 22 and reading out the image data written in the frame memory 22. The processes of writing and reading image data executed in the write-read controller 220 is carried out based on control signals generated in the write-read controller 220. The image data read from the frame memory 22 is output as digital image data DV1.

The menu window display controller 230 has a function of outputting menu window display data MND representing a menu window. The menu window display controller 230 receives the digital image data DV1 output from the read-write controller 220 and outputs either the given digital image data DV1 or the menu window display data MND. Using the menu window expressed by the menu window display data MND enables a variety of settings, for example, display conditions (including the image quality) of images in the projection display apparatus. In the structure of the embodiment of FIG. 3, the processing program recorded in the memory card 42 can be edited through the menu window as will be discussed below. The menu window display controller 230 is controlled by the CPU 20 via the bus 20*a*. The menu window display controller 230 and the CPU 20 correspond to the processing program editor of the present invention.

The liquid-crystal panel driving circuit 14 shown in FIG. 2 outputs a driving signal DS suitable to drive the liquid-crystal panel 16 in response to the digital image data DV1 or the menu window display data MND supplied from the image processing circuit 10. The liquid-crystal panel 16 drives respective pixels based on the given driving signal DS, so as to modulate illumination light emitted from the illumination optical system 100 at respective pixels. The light transmitted through the liquid-crystal panel 16 forms image light on the panel surface. The image light formed by the liquid-crystal panel 16 is projected by the projection optical system 102 on the screen 104, so that an image is displayed on the screen 104.

In the projection display apparatus of the first embodiment, user's instructions, for example, an instruction to display the menu screen, are mainly given through operations of a remote control 32. The remote control regulator 30 (FIG. 2) receives the instructions from the remote control 32 and transfers the instructions to the CPU 20. Another input section having, for example, buttons may be provided on the main body of the projection display apparatus 2, in place of the remote control 32 or in addition to the remote control 32.

Figure 4:
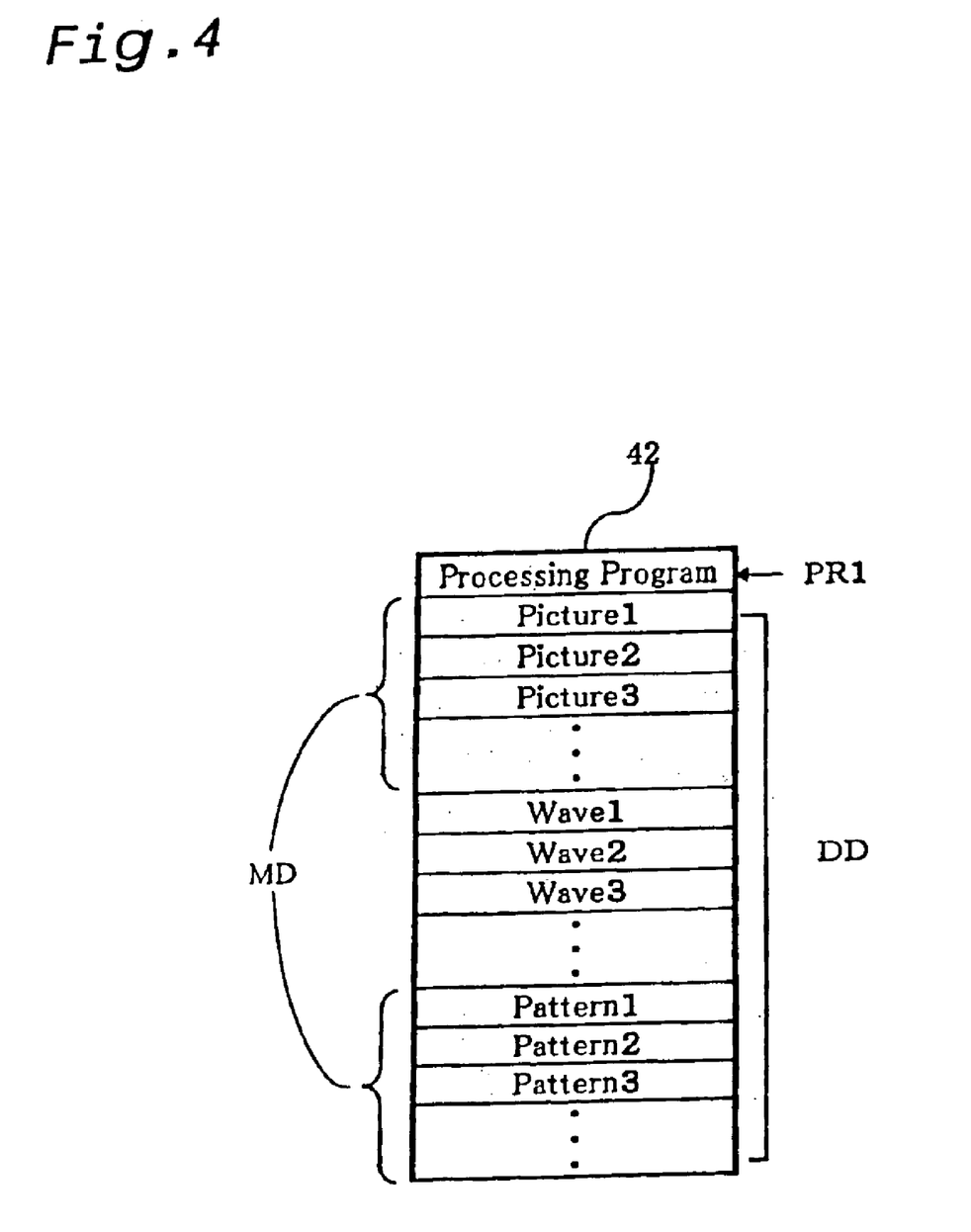
FIG. 4 shows a variety of data recorded in the memory card 42 of FIG. 2.

FIG. 4 shows a variety of data recorded in the memory card 42 of FIG. 2. The data stored in the memory card 42 is prepared in advance with a personal computer, for example. The memory card 42 shown in FIG. 4 stores a processing program PR1, which represents a series of processing to be executed by the projection display apparatus, as well as a variety of data DD including image data (Picture 1, Picture 2, Picture 3, . . . ), sound data (Wave 1, Wave 2, Wave 3, . . . ) and patterned image data (Pattern 1, Pattern 2, Pattern 3, . . . ). Data representing images of, for example, the presentation sheets are stored as the image data (Picture 1, Picture 2, Picture 3, . . . ). Data representing, for example, black "solid" images and images of company logos are stored as the patterned image data. Detailed records of the presentation are stored, for example, as the sound data (Wave 1, Wave 2, Wave 3, . . . ). The variety of data DD may include any appropriate data other than the above data, for example, motion image data. The image data (Picture 1, Picture 2, Picture 3, . . . ), the patterned image data (Pattern 1, Pattern 2, Pattern 3, . . . ), and other data representing images out of the variety of data DD stored in the memory card 42 correspond to the memory image data MD discussed above.

Figure 5:
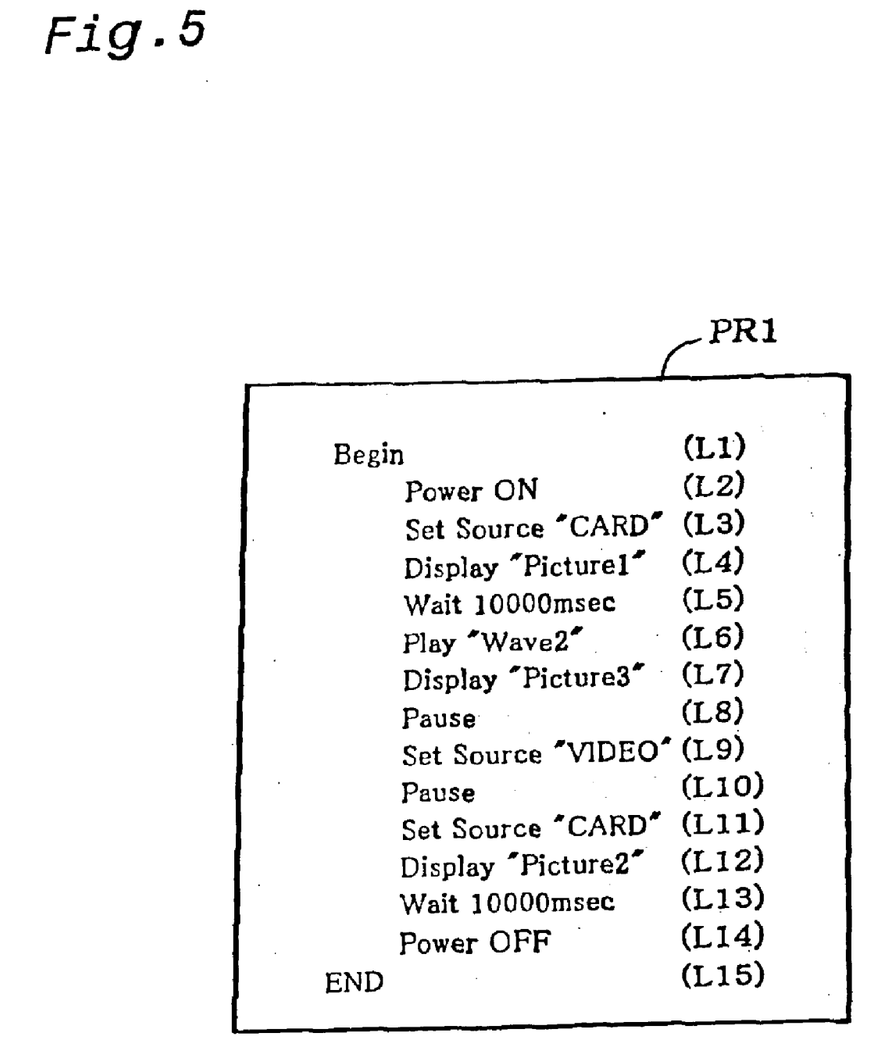
FIG. 5 shows the contents of the processing program PR1 shown in FIG. 4.

FIG. 5 shows the contents of the processing program PR1 shown in FIG. 4. A script file of a text format as shown in FIG. 5 is used as the processing program PR1 in this embodiment. Symbols such as "L1" given to the right side of FIG. 5 are tentatively allocated to represent line numbers and are not included in the actual script file. "Begin" on a line number L1 and "End" on a line number L15 respectively represent the start and the end of the processing program PR1. In the actual procedure, the processing is executed with regard to line numbers L2 through L14 between the line number L1 "Begin" and the line number L15 "End".

Figure 6:
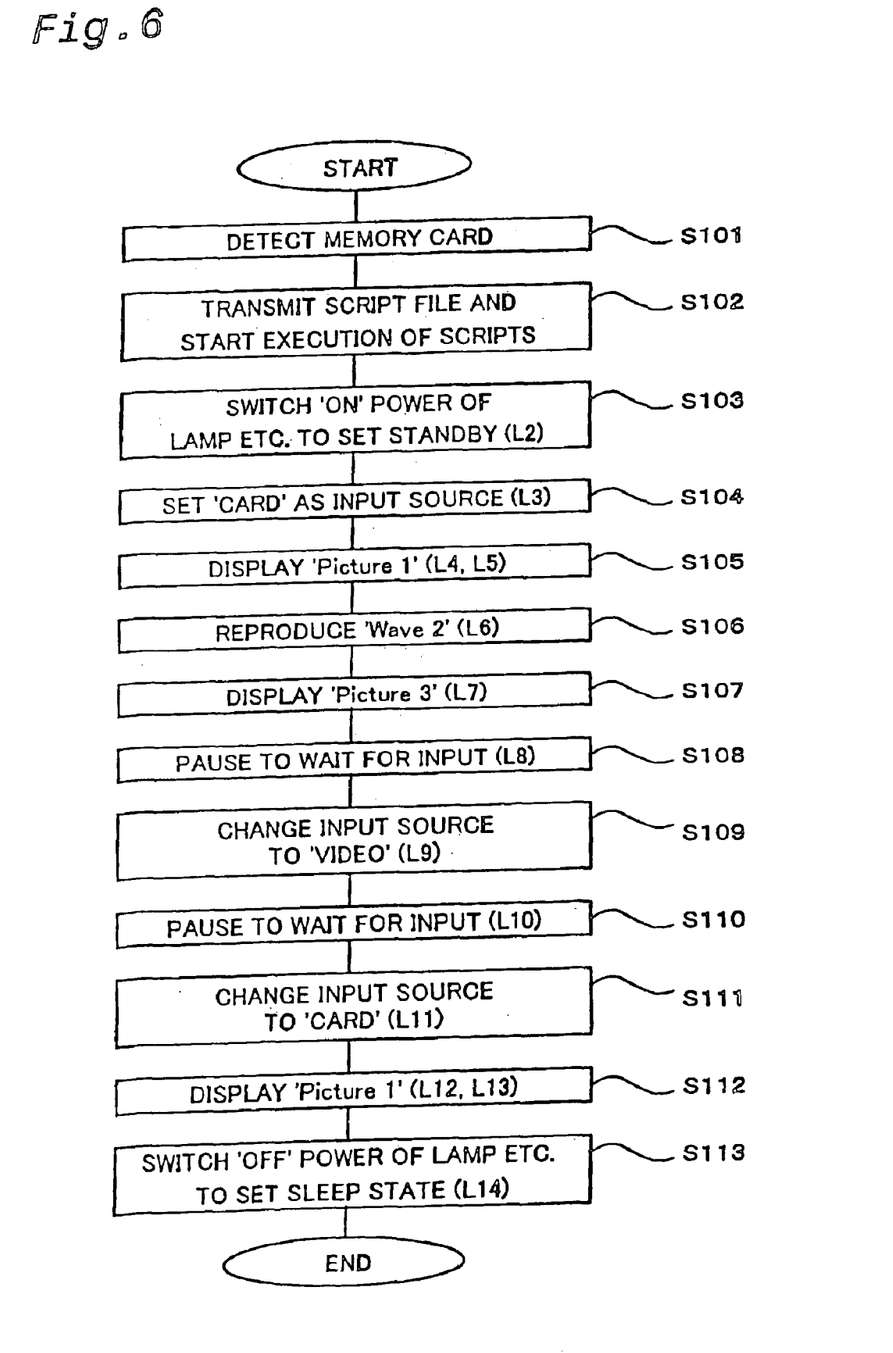
FIG. 6 is a flowchart showing a processing routine executed by the projection display apparatus according to the processing program PR1 shown in FIG. 5.

FIG. 6 is a flowchart showing a processing routine executed by the projection display apparatus according to the processing program PR1 shown in FIG. 5. The processing of steps S101 and S102, however, do not follow the processing program PR1. The processing routine shown in FIG. 6 is executed in the case where at least part of the projection display apparatus is in a sleep state prior to the processing of step S101. Under such conditions, no images are displayed on the screen 104.

When the user attaches the memory card 42 to the memory controller 40 (FIG. 2), the processing of step S101 detects an attachment of the memory card 42 to the memory controller 40. In one applicable arrangement to detect the memory card 42, a non-illustrated mechanical switch, which is provided inside the memory controller 40, is set in an ON position in response to the attachment of the memory card 42. In another arrangement, a sensor, which is provided inside the memory controller 40, determines whether or not the memory card 42 is attached. When the attachment of the memory card 42 is detected at step S101, the process proceeds to step S102.

At step S102, the CPU 20 (FIG. 2) transfers the processing program PR1 (FIG. 5) stored in the memory card 42 to a non-illustrated RAM and starts the execution of the processing program. As clearly understood from the above description, at least the memory card detection function in the memory controller 40 is not in the sleep state. At this moment, however, the image processing circuit 10, the liquid-crystal panel driving circuit 14, the liquid-crystal panel 16, and the lamp 101 are set in the Sleep State. As used herein, the term "sleep state" represents that the hardware circuit is not in the normal working state. In the structure of the first embodiment, the image processing circuit 10, the liquid-crystal panel driving circuit 14, and the liquid-crystal panel 16 are set in the sleep state by regulating a clock signal or another control signal, or more specifically by ceasing the supply of the clock signal. The lamp 101 is set in the sleep state by ceasing the supply of electric power. Some hardware circuits are set in the sleep state by lowering the frequency of the clock signal. Another possible application regulates the electric power supplied to the lamp 101 as the light source to lower the luminance of the displayed image or regulates a cooling fan provided in the projection display apparatus.

At step S103, the processing of the line number L2 in the processing program PR1 (FIG. 5) is carried out. The "Power ON" command on the line number L2 causes the whole projection display apparatus to be on standby. A concrete procedure gives the control signal and the power supply to the respective constituents in the sleep state, so as to set the respective constituents in the normal working state, that is, in the standby state. The projection display apparatus set in the standby state enables an image to be displayed on the screen 104.

At step S104, the processing of the line number L3 in the processing program PR1 (FIG. 5) is carried out. The "Set Source" command on the line number L3 causes the image processing circuit 10 (FIG. 3) to set the source of the image data, which is to be written into the frame memory 22. As described previously with respect to FIG. 3, the image processing circuit 10 sets either the external image data ED based on the analog video signal AV1, or the memory image data MD read from the memory card 42 as the input source. On the line number L3, "CARD" representing the memory card 42 is specified after the "Set Source" command. The memory image data MD stored in the memory card 42 is thus set as the input source in this example.

At step S105, the processing of the line number L4 in the processing program PR1 (FIG. 5) is carried out. The "Display" command on the line number L4 displays the memory image data in the memory card 42 (FIG. 4), which is the input source set at step S104. On the line number L4, "Picture 1" is specified after the "Display" command, so that the memory image data Picture 1 in the memory card 42 (FIG. 4) is displayed. In accordance with a concrete procedure, the CPU 20 reads the memory image data Picture 1 from the memory card 42 (FIG. 4), and the image processing circuit 10 writes the memory image data Picture 1 into the frame memory 22. The image processing circuit 10 outputs the memory image data Picture 1 as the digital image data DV1. These causes an image expressed by the memory image data Picture 1 to be displayed on the screen 104.

At step S105, the processing of the line number L5 in the processing program PR1 is also carried out. The "Wait" command on line number L5 keeps the state of execution of the previous process (in the example of FIG. 5, the processing of the line number L4) for a predetermined period of time. In this embodiment, the previous processing is kept by the specified unit of "1000 msec". Thus, the processing of step S105 causes the display of the memory image data Picture 1 executed by the processing of the line number L4 to be kept for 10000 msec specified on the line number L5. The use of the Wait command sets the time in which each image is displayed. This arrangement enables the presentation sheets to be automatically fed at preset time intervals.

At step S106, the processing of the line number L6 in the processing program PR1 (FIG. 5) is carried out. The "Play" command on the line number L6 reproduces the sound data in the memory card 42 (FIG. 4), which is the input source set at step S104 (the line number L3). On line number L6, "Wave 2" is specified after the "Play" command, so that the sound data Wave 2 in the memory card 42 (FIG. 4) is reproduced. In accordance with a concrete procedure, the CPU 20 reads the sound data Wave 2 from the memory card 42 (FIG. 4) and causes the sound data Wave 2 to be reproduced by the speaker 50 (FIG. 2).

At step S107, the processing of the line number L7 in the processing program PR1 (FIG. 5) is carried out. On line number L7, "Picture 3" is specified after the "Display" command. In the same manner as the processing of step S105 (line number L4), the memory image data Picture 3 in the memory card 42 (FIG. 4) is displayed on the screen 104.

At step S108, the processing of the line number L8 in the processing program PR1 (FIG. 5) is carried out. The "Pause" command on line number L8 keeps the state of execution of the previous process (in the example of FIG. 5, the processing of line number L7) until a user's input is given. At this moment, the CPU 20 pauses the execution of the processing program PR1. When the user gives some input through an operation of the remote control 32 (FIG. 2), the pause is cancelled. After the cancellation of the pause, the process proceeds to step S109.

At step S109, the processing of the line number L9 in the processing program PR1 (FIG. 5) is carried out. On line number L9, "VIDEO" representing the external image data ED based on the analog video signal AV1 is specified after the "Set Source" command. At this moment, the CPU 20 sets the external image data ED supplied to the image processing circuit 10 as the input source. Namely the input source "CARD" set at step S104 (line number L3) is changed over to VIDEO. The image processing circuit 10 writes the external image data ED into the frame memory 22, so that an image expressed by the external image data ED is displayed on the screen 104. The external image data may be, for example, samples of commerce shot with a video camera.

At step S110, the processing of the line number L10 in the processing program PR1 (FIG. 5) is carried out. In the same manner as the processing of step S108 (line number L8), the "Pause" command on line number L10 pauses the execution of the processing program PR1. The pause is cancelled in response to an input, for example, through an operation of the remote control 32, and the process proceeds to step S111.

At step S111, the processing of the line number L11 in the processing program PR1 (FIG. 5) is carried out. On the line number L11, "CARD" representing the memory card 42 is specified after the "Set Source" command. The image processing circuit 10 thus again selects the memory image data MD supplied from the memory card 42 as the input source.

At step S112, the processing of the line number L12 in the processing program PR1 (FIG. 5) is carried out. On line number L12, "Picture 2" is specified after the "Display" command. In the same manner as the processing of step S105 (line number L4) described above, an image expressed by the memory image data Picture 2 is displayed on the screen 104. Also, at step S112, the processing of the line number L13 in the processing program PR1 is carried out. On line number L13, "10000 msec" is specified after the "Wait" command. In the same manner as the processing of step S105 (line number L5), the image expressed by the memory image data Picture 2 is displayed on the screen 104 for 10000 msec.

At step S113, the processing of the line number L14 in the processing program PR1 (FIG. 5) is carried out. The "Power OFF" command on line number L14 causes at least part of the projection display apparatus to be set in the sleep state. In the structure of the first embodiment, as described previously, the functions of the image processing circuit 10, the liquid-crystal panel driving circuit 14, the liquid-crystal panel 16, and the lamp 101 fall into the sleep state. In the sleep state, no images are displayed on the screen 104.

The contents of the processing program shown in FIG. 5 are executed in this manner. Commands other than those in FIG. 5 ("Power ON", "Power OFF", "Set Source", "Display", "Play", "Pause", and "Wait") may also be used. For example, the "Repeat" command may be used to repeatedly execute all or part of the series of the processing of the line numbers L2 through L14 described above. Other available commands include the "Stop" command to stop the execution of the processing program and the "Restart" command to resume the execution of the processing program.

The processing of FIG. 6 regards the case where at least part of the projection display apparatus is set in the sleep state prior to the processing of step S101. The processing program PR1 of FIG. 5 may also be used in the case where the whole projection display apparatus is set in the standby state. When the projection display apparatus is on standby, the processing of the line number L2 (step S103) in the processing program PR1 is not required and is accordingly neglected.

As described above, the projection display apparatus of the embodiment controls the operations of the hardware circuits according to the instructions described in the processing program. Control of the operations of the hardware circuits includes regulation of the clock signal and other control signals supplied to the hardware circuits. The control regulates the control signals to set the hardware circuits in the sleep state or in the standby state, as well as regulates the control signals to change over the input source. The control of the operations of the hardware circuits also includes the control of the electric power supply circuit to set the hardware circuits in the sleep state or in the standby state. Controlling the operations of the hardware circuits according to the instructions of the processing program advantageously enables the projection display apparatus to be automatically activated and stopped. In the arrangement of the embodiment as described above, the hardware circuits in the projection display apparatus are set in the sleep state or in the standby state through both the control of the electric power supply and the regulation of the control signals. Possible modification may attain the sleep state or the standby state through only the control of the electric power supply or through only the regulation of the control signals.

Figure 7:
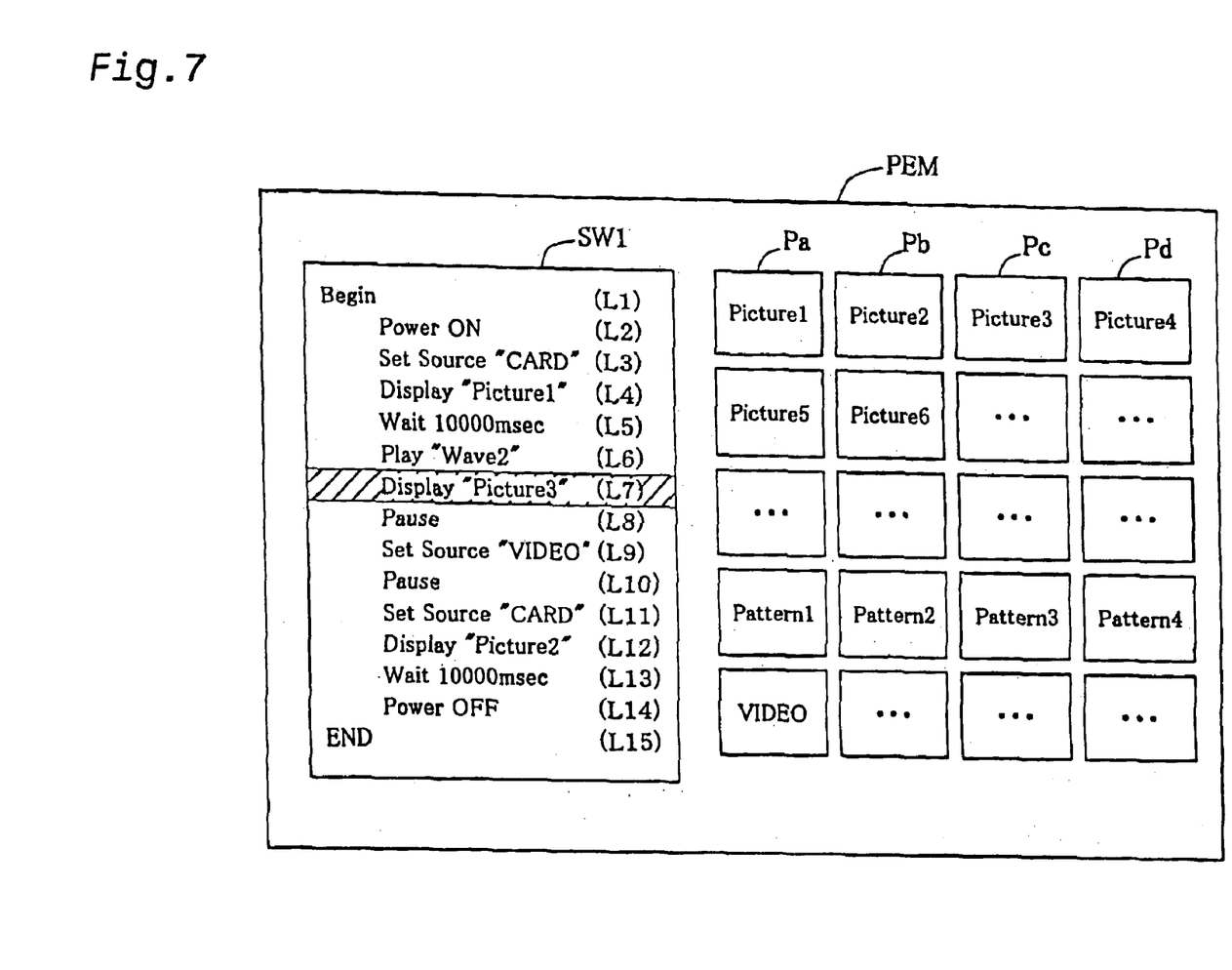
FIG. 7 shows a menu window to edit the processing program.

FIG. 7 shows a menu window to edit the processing program. The processing program editing window PEM shown in FIG. 7 is an image displayed on the screen 104 in response to the menu window display data MND output from the menu window display controller 230 shown in FIG. 3. The processing program editing window PEM includes a script display area SW1 to display the contents of the processing program. In the example of FIG. 7, the processing program PR1 identical with that of FIG. 5 is displayed in the script display area SW1 of FIG. 7.

In the processing program editing window PEM, a variety of images Pa, Pb, Pc, ..., that are available in the projection display apparatus are previewed. In this embodiment, the image data given to the selector 210 shown in FIG. 3 are available image data. The images expressed by the memory image data MD and the external image data ED are thus previewed in the processing program editing window PEM. The images expressed by the image data (Picture 1, Picture 2, Picture 3, ...) and the patterned image data (Pattern 1, Pattern 2, Pattern 3, ...) included in the memory card 42 shown in FIG. 4 are previewed as the memory image data MD. The images expressed by the analog video signals AV1 (VIDEO) are previewed as the external image data ED. The respective images Pa, Pb, Pc, ... shown in FIG. 7 are displayed, based on a set of image data collected by the cooperation of the menu window display controller 230 (FIG. 3) and the CPU 20.

In the processing program editing window PEM, the processing program displayed in the script display area SW1 is edited by specifying any of the various images Pa, Pb, Pc, ... displayed in the window through operations of the remote control 32. In accordance with a concrete procedure, the user first specifies a desired line to be edited in the processing program PR1 displayed in the script display area SW1 with the remote control 32. In the example of FIG. 7, the line number L7 (filled with slant lines) is specified. When the image (Picture 3) to be displayed by the processing of the line number L7 is changed to the previewed image Pd (image data Picture 4), the user selects a non-illustrated "Change Button" on the remote control 32 and then specifies the previewed image Pd with the remote control 32. These changes the image data Picture 3 to the image data Picture 4 on the line number L7. In a similar manner, the image data to be displayed in the processing program PR1 may arbitrarily be added and deleted. This arrangement enables the processing program to be edited readily only through the operations of the remote control 32. The available images are previewed in the processing program editing window PEM. This advantageously enables the user to edit the processing programs while visually checking the editing process. The processing program thus edited is written into the memory card 42 by means of the memory controller 40 and subsequent processing is carried out according to the edited processing program.

As described above, the projection-display apparatus of the present invention enables images to be displayed using the memory image data stored in the memory card 42 according to the instructions of the processing program stored in the memory card 42. This arrangement enables the projection display apparatus, which may not be connected with the computer, to automatically execute the series of processing steps and display projected images.

B. Second Embodiment

Figure 8:
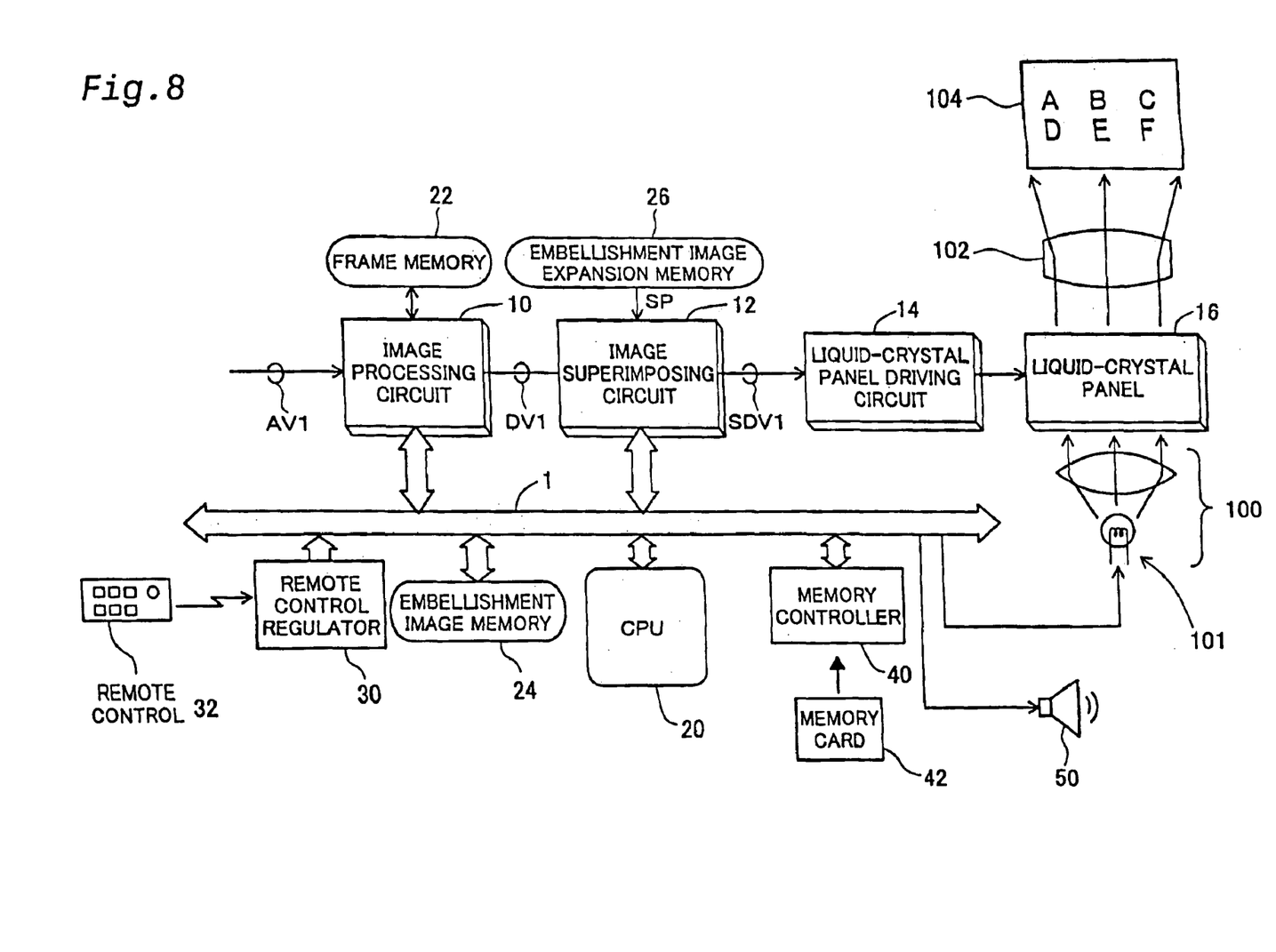
FIG. 8 is a block diagram showing the general structure of another projection display apparatus in a second embodiment.

FIG. 8 is a block diagram illustrating the general structure of another projection display apparatus according to a second embodiment of the present invention. The apparatus of the second embodiment includes an image superimposing circuit 12, an embellishment image memory 24, and an embellishment image expansion memory 26, in addition to the configuration shown in FIG. 2. The functions of the constituents of this apparatus other than the additional elements, the image superimposing circuit 12, the embellishment image memory 24, and the embellishment image expansion memory 26, are substantially identical with the functions of the respective constituents shown in FIG. 2, and are thus not specifically described here. The image processing circuit 10, the liquid-crystal panel driving circuit 14, the CPU 20, the frame memory 22, the remote control regulator 30, the image superimposing circuit 12, the embellishment image memory 24, and the embellishment image expansion memory 26 of this embodiment correspond to the image processing section of the present invention.

The embellishment image memory 24 stores embellishment image data, which is to be superimposed on the digital image data DV1 output from the image processing circuit 10. The embellishment image data is used to modify the image expressed by the digital image data DV1, and include a variety of image data representing marker images, pointing images, and ring-shaped images. In this embodiment, the embellishment image data is stored in the embellishment image memory 24 in a compressed manner. The embellishment image data in the embellishment image memory 24 is expanded in a bit-map format and stored in the embellishment image expansion memory 26 as embellishment image expanded data SP. The embellishment image expanded data SP is supplied to the image superimposing circuit 12 to be superimposed on the digital image data DV1. The CPU 20 executes the expansion of the embellishment image data and the supply of the embellishment image data to the image superimposing circuit 12.

In the structure of this embodiment, the embellishment image data stored in the embellishment image memory 24 is expanded in the embellishment image expansion memory 26. The embellishment image data may alternatively be expanded in the embellishment image memory 24. In this case, the embellishment image expansion memory 26 may be omitted. The embellishment image data stored in the embellishment image memory 24 may not be compressed. The compression, however, advantageously reduces the data capacity required for the embellishment image memory 24.

The digital image data DV1 supplied from the image processing circuit 10 and the embellishment image expanded data SP supplied from the embellishment image expansion memory 26 are input into the image superimposing circuit 12. The image superimposing circuit 12 has a function of superimposing the embellishment image expanded data SP upon the digital image data DV1. The image superimposing circuit 12 includes a non-illustrated selector, which is switched over to implement the superimposing process. The switchover operations of the selector are carried out in response to a switchover signal supplied from the CPU 20 via the bus 20a. In accordance with a concrete procedure, a switchover operation of the selector carried out at a preset position in the image expressed by the digital image data DV1 triggers the superimposition of the image expressed by the embellishment image expanded data SP. This arrangement gives superimposed image data SDV1 that is superimposed by the embellishment image expanded data SP.

Figure 9:
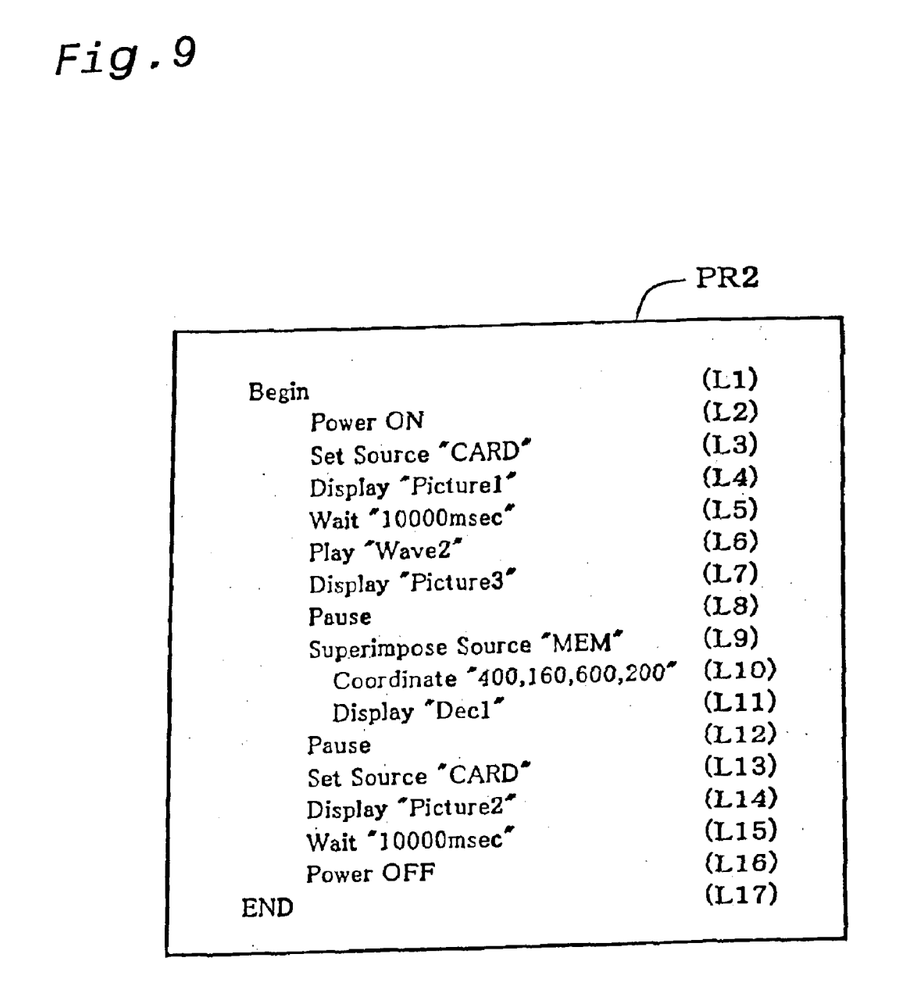
FIG. 9 shows an exemplified processing program PR2 that carries out a process of superimposing an embellishment image.

FIG. 9 shows an exemplified processing program PR2 that carries out a process of superimposing an embellishment image. The processing program PR2 includes the processing of line numbers L9 through L11, in place of the line number L9 (Set Source "VIDEO") in the processing program PR1 shown in FIG. 5. The processing of the line numbers L9 through L11 in the processing program PR2 is carried out to superimpose the embellishment image expanded data SP upon the digital image data DV1 supplied to the image superimposing circuit 12 and to display the superimposed image.

The line number L9 in the processing program PR2 has the "Superimpose Source" command to set the source of the embellishment image data used for the superimposing process. This command is followed by "MEM" representing the embellishment image memory 24. Namely the embellishment image memory 24 is set as the input source of the embellishment image. The line number L10 has the "Coordinate" command to specify a superimposing position (area) of the embellishment image. This command is followed by coordinate values "400, 160, 600, 200" to set the superimposing position of the embellishment image. The coordinate values in this embodiment are specified in the case where the display area of the liquid-crystal panel is 800×600. The coordinate values 400, 160, 600, 200 specify a first set of coordinates (400, 160) as a starting point of the superimposing area and a second set of coordinates (600, 200) as a terminal point thereof. The subsequent line number L10 has a data name "Dec1" to specify the embellishment image data after the "Display" command. This arrangement enables the embellishment image data Dec1 to be superimposed in the superimposing position specified by the processing of the line number L10, so as to display a superimposed image on the screen 104. On conclusion of the processing up to the line number L11, the image expressed by the superimposed image data SDV1 output from the image superimposing circuit 12 is a superimposed image including the image of the embellishment image data Dec1 superimposed upon the image of the image data Picture 3 on the line number L7.

Figure 10:
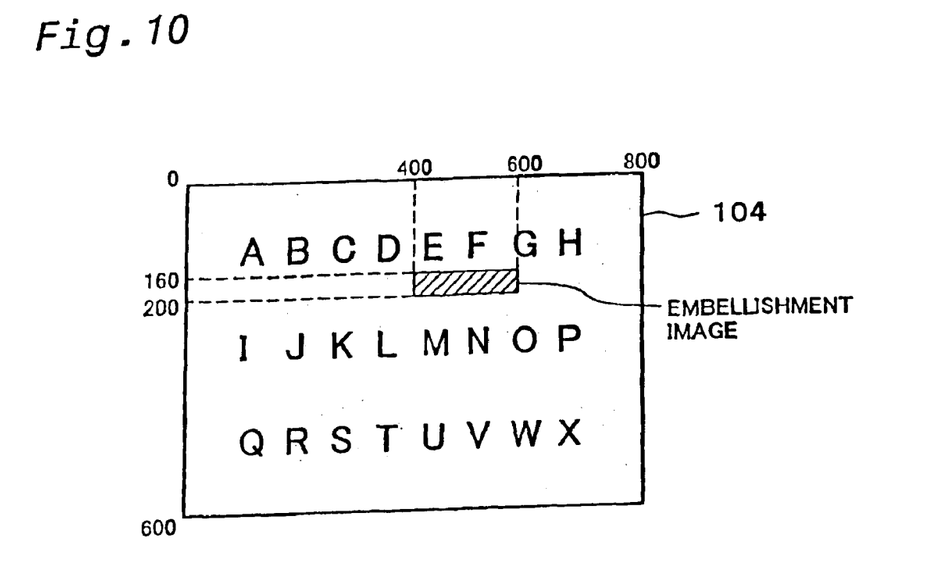
FIG. 10 shows an image expressed by superimposed image data SDV1 output from the image superimposing circuit 12 (FIG. 8) after execution of the processing of the line number L11 in the processing program PR2 shown in FIG. 9.

FIG. 10 shows an image expressed by the superimposed image data SDV1 output from the image superimposing circuit 12 (FIG. 8) after execution of the processing of the line number L11 in the processing program PR2 shown in FIG. 9. When the processing of the line number L11 in the processing program PR2 shown in FIG. 9 is carried out, a superimposed image is displayed, where the image expressed by the embellishment image data Dec1 is superimposed upon the image expressed by the image data Picture 3 on the line number L7. In the example of FIG. 10, a document image of "A, B, C, . . ." corresponds to the image expressed by the image data Picture 3, and a marker image (filled with the slant lines) corresponds to the image expressed by the embellishment image data Dec1. As shown in FIG. 10, the embellishment image is superimposed in the position specified by the processing program of FIG. 9. More specifically the embellishment image is superimposed in the area defined by the first set of coordinates (400, 160) and the second set of coordinates (600, 200) specified by the processing of the line number L10.

Figure 11:
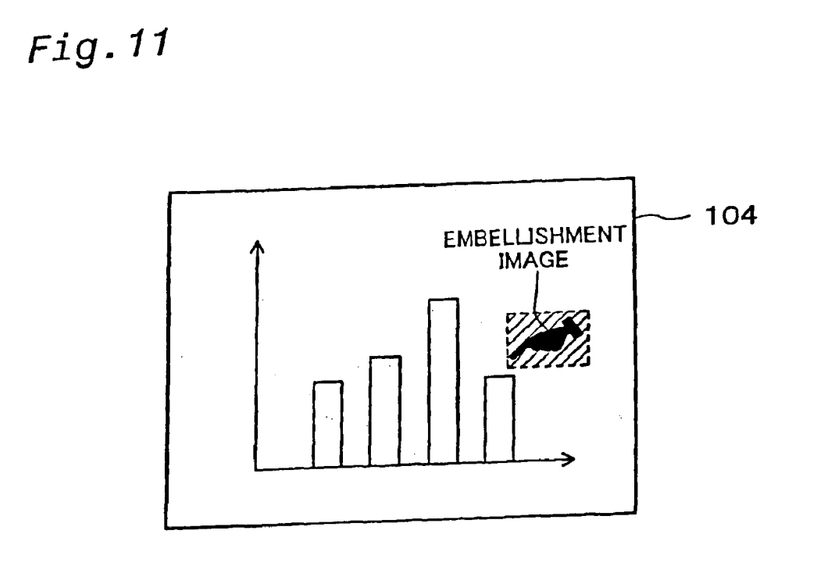
FIG. 11 shows another image expressed by the superimposed image data SDV1 output from the image superimposing circuit 12 (FIG. 8).

FIG. 11 shows another image expressed by the superimposed image data SDV1 output from the image superimposing circuit 12 (FIG. 8). In the example of FIG. 11, an image of a bar graph corresponds to the image expressed by the digital image data DV1 given to the image superimposing circuit 12, and a pointing image corresponds to the image expressed by the embellishment image data supplied from the embellishment image memory 24. The image expressed by the digital image data DV1 is displayed in the vicinity of the pointing image, which is filled with the slant lines. Namely the embellishment image is not restricted to a rectangular image as shown in FIG. 10 but may have any arbitrary shape. This is attained by providing predetermined pixel information as pixel data of the area filled with the slant lines, which is included in the rectangular embellishment image expanded data SP. Pixel data that is generally not used (for example, the pixel data having '0' for all the bits) or a flag is given as the specific pixel information with regard to the area filled with the slant lines. The superimposing process is not carried out for the pixels having such pixel information. This arrangement enables the superimposition of the embellishment image having an arbitrary shape.

As described above, the image having the embellishment effects is superimposed upon the image expressed by the digital image data DV1 output from the image processing circuit 10. This ensures the effective display of the presentation sheets.

The present invention is not restricted to the above embodiments or their modifications, but there may be many other modifications, changes, and alterations without departing from the scope or spirit of the main characteristics of the present invention. Some possible modifications are given below.

(1) In the embodiments discussed above, the projection display apparatus 1 has only one memory slot 3 as shown in FIG. 1. The projection display apparatus 1 may, however, include a plurality of memory slots. This configuration allows the use of a plurality of memories and thereby enables the projection display apparatus to project and display a large number of image data. In this case, the processing program may be recorded in only one of the plural memories, and any one of the other memories is selected as the input source to use the memory image data stored in the selected memory.

In the embodiments discussed above, only the external image data ED based on the analog video signals AV1 are the image data externally supplied to the projection display apparatus. Other image data may, however, be supplied to the projection display apparatus.

(2) In the first and the second embodiments discussed above, the image processing circuit 10 selects either one of the external image data ED based on the analog video signal AV1 and the memory image data MD supplied from the memory card 42 and writes the selected image data into the frame memory 22. The image data written into the frame memory 22 may be composite image data obtained by combining the both. In this case, the superimposing process is carried out with the "Superimpose" command as shown in the line numbers L9 through L11 of FIG. 9. The image processing circuit 10 carries out this superimposing process.

In the second embodiment, the superimposed image data SDV1 are generated by the non-illustrated selector included in the image superimposing circuit 12. (FIG. 8). Multipliers and an adder may be used in place of the selector. In this structure, the adder combines the digital image data DV1 in one multiplier with the embellishment image expanded data SP in the other multiplier. A coefficient "1" is allocated to one of the two multipliers, and another coefficient "0" to the other. This arrangement ensures the superimposing process similar to that implemented by the selector. Alternatively a coefficient "½" may be allocated to both of the two multipliers. In this case, a resulting superimposed image includes the image of the embellishment image expanded data SP superimposed upon the image of the digital image data DV1 in a translucent manner.

(3) In the embodiments discussed above, for example, the lamp 101 (FIG. 2) is switched on by the processing of the line number L2 included in the processing program PR1 shown in FIG. 5 to set the whole projection display apparatus on standby. One possible modification switches the lamp 101 on after elapse of a preset time period. Such modified arrangement effectively prevents a potential situation, in which image data to be displayed have not yet been supplied to the liquid-crystal panel 16 when the lamp 101 is switched on. Another possible modification causes a black solid image to be forcibly displayed as an initial image immediately after the lamp 101 is switched on.

(4) In the embodiments discussed above, the liquid-crystal panel 16 is used as the electro-optic device of the projection display apparatus. The electro-optic device is, however, not restricted to the liquid-crystal panel, but may be a micromirror-type light modulator or a CRT. One example of the micromirror-type light modulator is a DMD (digital micromirror device) (trade mark by TI Corporation).

(5) In the above embodiments, part of the hardware configuration may be replaced by the software. Part of the arrangement attained by the software may, on the other hand, be replaced by the hardware configuration.

This document claims priority from and contains subject matter related to Japanese patent application number 11-71737 and PCT/JP00/01619, the entire contents of which are incorporated herein by reference.

What is claimed is:

1. A projector that carries out processing with information stored in a portable memory, comprising:
   a memory controller configured to read out the information stored in the portable memory, the information including a processing program which represents a series of processing steps to be executed by the projector and image data;
   a processing section configured to prepare display image data representing an image to be displayed, using the image data stored in the portable memory according to a first instruction of the processing program;
   an electro-optic device configured to form image light in response to the display image data;
   an optical system configured to project the image light to display the image, and
   an electric power supply circuit configured to supply electric power to a hardware circuit of the projector, wherein the processing section is further configured to carry out control of the electric power supply circuit according to a second instruction of the processing program.

2. The projector in accordance with claim 1, wherein the processing section controls the electric power supply circuit so as to set the hardware circuit in either one of a sleep state and a standby state according to the second instruction.

3. The projector in accordance with claim 1, further comprising: a light source as the hardware circuit configured to emit light to illuminate the electro-optic device, the electro-optic device forming the image light by modulating the light form the light source,
wherein the processing section controls the electric power supply circuit so as to determine supply of electric power for the light source according to the second instruction.

4. The projector in accordance with claim 1, wherein the information further including sound data,
the processing section is further configured to reproduce sound using the sound data stored in the portable memory according to a third instruction of the processing program.

5. The projector in accordance with claim 1, wherein the processing section is further configured to select either one of image data supplied externally and image data read from the portable memory, and prepare the display image data using the selected image data according to a fourth instruction of the processing program.

6. The projector in accordance with claim 1, further comprising:
   an image memory configured to store at least one embellishment image data,
   wherein the processing section is further configured to combine either one of the image data read from the portable memory and the image data supplied externally with the embellishment image data, and prepare the display image data using the combined image data according to a fourth instruction of the processing program.

7. The projector in accordance with claim 1, wherein the processing section comprises a processing program editor configured to edit the processing program, and
   wherein the memory controller is further configured to write the processing program edited by the processing program editor into the portable memory.

8. A method of displaying an image with a projector that includes an electro-optic device and an electric power supply circuit configured to supply electric power to a hardware circuit of the projector, and carries out processing with information stored in a portable memory, the method comprising the steps of:
   (a) reading out the information stored in the portable memory, the information including a processing program which represents a series of processing steps to be executed by the projector and image data;
   (b) preparing display image data representing an image to be displayed, using the image data stored in the portable memory according to a first instruction of the processing program;
   (c) causing the electro-optic device to form image light in response to the display image data; and
   (d) projecting the image light to display the image,
   the method further comprising:
   (e) carrying out control of the electric power supply circuit according to a second instruction of the processing program.

9. The method in accordance with claim 8, wherein the step (e) includes controlling the electric power supply circuit so as to set the hardware circuit in either one of a sleep state and a standby state according to the second instruction.

10. The method in accordance with claim 8, wherein the projector further includes a light source as the hardware circuit configured to emit light to illuminate the electro-optic device, the electro-optic device forming the image light by modulating the light form the light source, and
the step (e) includes controlling the electric power supply circuit so as to determine supply of electric power for the light source according to the second instruction.

11. The method in accordance with claim 8, wherein the information further includes sound data, the method further comprising:

(f) reproducing sound, using the sound data stored in the portable memory according to a third instruction of the processing program.

12. The method in accordance with claim 8, wherein the step (b) further includes selecting either one of image data supplied externally and image data read from the portable memory, and preparing the display image data using the selected image data according to a forth instruction of the processing program.

13. The method in accordance with claim 8, wherein the projector further includes an image memory configured to store at least one embellishment image data, and the step (b) further includes combining either one of the image data read from the portable memory and the image data supplied externally with the embellishment image data, and preparing the display image data using the combined image data according to a forth instruction of the processing program.

14. The method in accordance with claim 8, further comprising:

(g) editing the processing program, and writing the edited processing program into the portable memory.

* * * * *